United States Patent [19]

Gor

[11] 3,908,050
[45] Sept. 23, 1975

[54] METAL COATING COMPOSITIONS PREPARED FROM AQUEOUS DISPERSIONS OF CARBOXYL CONTAINING POLYESTER RESINS

[75] Inventor: Vishnu P. J. Gor, Country Club Hills, Ill.

[73] Assignee: Continental Can Company, Inc., New York, N.Y.

[22] Filed: June 19, 1974

[21] Appl. No.: 480,903

[52] U.S. Cl........ 427/388; 260/29.2 E; 260/29.4 R; 260/850; 427/239; 427/387; 428/35; 428/458; 428/460
[51] Int. Cl.² ........................................ C08L 61/28
[58] Field of Search .......... 260/850, 29.2 E, 29.4 R; 427/388

[56] References Cited
UNITED STATES PATENTS

| | | | |
|---|---|---|---|
| 3,320,336 | 5/1967 | Duke et al. | 260/861 |
| 3,444,114 | 5/1969 | Downing | 260/850 |
| 3,449,467 | 6/1969 | Wynstra | 260/850 |
| 3,549,577 | 12/1970 | Stromberg | 260/850 |

*Primary Examiner*—Murray Tillman
*Assistant Examiner*—A. H. Koeckert
*Attorney, Agent, or Firm*—Paul Shapiro; Joseph E. Kerwin; William A. Dittmann

[57] ABSTRACT

Metal surfaces are coated with an aqueous dispersion of a vehicle comprised of a combination of heat curable water dispersible thermosetting aminoplast resin and a water dispersible carboxyl containing polyester resin prepared from a mixture of polycarboxylic acids and an esterdiol.

6 Claims, No Drawings

METAL COATING COMPOSITIONS PREPARED FROM AQUEOUS DISPERSIONS OF CARBOXYL CONTAINING POLYESTER RESINS

BACKGROUND OF THE INVENTION

1. Field of the Invention

This invention relates to coating metal containers and more particularly to coating metal containers using an aqueous dispersion of a carboxyl containing polyester resin.

2. Prior Art

In metal container manufacture, after the can body is completely configurated and decorated, but before the end is assembled onto the body, the interior surface of the can body is coated with a protective coating of a synthetic resin material.

It has been the conventional practice in the metal container industry to apply, as the coating material, a heat hardenable resin mixed in a volatile organic solvent which is sprayed into the open end of the container body and onto the interior walls thereof. The wet coated container is then passed through an oven in which hot air is circulated to evaporate the solvent and harden the coating.

Although organic solvent based resin coatings are widely used in the manufacture of metal food and beverage containers, one drawback to the use of these coating systems is that in the step of heat hardening the resin coating material, the solvent with which it is mixed is driven off and exhausted into the atmosphere, thereby giving rise to an atmospheric pollution problem. Within the last years there has been a great deal of attention directed to atmospheric pollution and the atmospheric contamination which results from industrial exhaust. One of the contaminants at which attention is now directed is the solvent exhausted from the curing ovens of metal container manufacturers.

One method of avoiding the air pollution problem associated with organic solvent based coatings that has been considered by container manufacturers is to substitute an aqueous dispersion medium for the organic solvent presently used. Water dilutable polyester resins have been considered as aqueous dispersable materials for coating metal containers but have not been used commercially, as coating films formed from those materials do not have the flexibility required in container manufacture, especially for carbonated beverage containers.

The high speed operations of container fabrication impose important qualifications on coating materials. A particularly important qualification is that the cured coating film must be adequately flexible to be fracture resistant under the mechanical operations associated with the double seaming of end closures onto the coated container. The coating film must also be adequately flexible to be fracture resistant under the conditions encountered during manufacture of the container. Lack of flexibility is a common reason for the rejection of many potentially useful container coating materials.

SUMMARY OF THE INVENTION

In accordance with the present invention, there is provided dispersed in an aqueous medium, a coating composition for application to metal surfaces to provide an adherent, flexible coating film which is comprised of (1) a carboxyl containing polyester resin prepared by reacting a stoichiometric excess of a mixture of (a) a major amount of an aromatic polycarboxylic acid or anhydride and (b) a minor amount of an aliphatic dicarboxylic acid having 4 to 10 carbon atoms with an esterdiol having the general formula

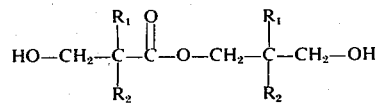

wherein each $R_1$ and $R_2$ represent the same or different alkyl groups of from 1–4 carbon atoms in combination with (2) a heat curable, thermosetting aminoplast resin such as an alkylated triazine/formaldehyde condensate.

As will hereinafter be illustrated, the aqueous coating compositions of the present invention when applied to metal surfaces such as aluminum and steel, provide a coating film of sufficient adhesion and flexibility that the coating compositions meet the exacting standards required for coating materials applied to containers used for the packaging of carbonated beverages.

PREFERRED EMBODIMENTS

The aromatic polycarboxylic acid component used to prepare the polyester ester resin is a mixture of different aromatic di- and tricarboxylic acids. Illustrative of aromatic dicarboxylic acids useful in the practice of the present invention are those having the general formula

wherein R is a aromatic radical having 6 to 12 carbon atoms. Illustrative of such aromatic dicarboxylic acids are phthalic acid, isophthalic acid, terephthalic acid, halogen substituted phthalic acids, alkyl substituted phthalic acids, wherein the alkyl substituent can be exemplified by methyl ethyl, n-propyl and the like, dicarboxylic naphthalenes and the like and the anhydrides thereof.

Aromatic tricarboxylic acids and anhydrides useful in the practice of the present invention are hemimellitic acid and its anhydride and trimellitic acid and its anhydride as well as the acids and anhydrides of the alkyl (1–4 carbon) and halogen substituted aromatic tricarboxylic acids.

In preparing the carboxyl containing polyester resins used in the practice of the present invention, it is preferred that a mixture of the aromatic tricarboxylic acid and the aromatic dicarboxylic acid be used at a weight ratio of about 3:2 to 9:1 and preferably a weight ratio of 4:1.

The aliphatic dicarboxylic acid used in minor amounts in the practice of the present invention is a dicarboxylic acid having 4 to 10 carbon atoms as for example, succinic acid, glutaric acid, adipic acid, suberic acid, azelaic acid and sebacic acid, adipic acid being preferred.

In preparing the carboxyl containing polyester resin used in the practice of the present invention it is an essential and critical feature of the present invention that the aliphatic dicarboxylic acid be used, in minor amounts, to prepare the polyester. The term "minor amount" when used in the present specification means about 0.1 to about 2.5 percent by weight based on the total weight of the acid components used to prepare the polyester resin. Thus, the acid component that is reacted with the esterdiol to prepare compositions of the present invention is generally comprised of about 97.5 to about 99.9 percent by weight of the mixture of aromatic polycarboxylic acids and about 0.1 to about 2.5 percent by weight of the aliphatic dicarboxylic acid. As will be hereinafter illustrated, if a minor amount of the aliphatic dicarboxylic acid is not used in the preparation of te polyester resin, the resulting cured coating film when applied to metal surfaces does not have sufficient flexibility to meet the requirements of the carbonated beverage industry.

The esterdiol component that is reacted with the mixture of polycarboxylic acids to prepare the carboxyl containing polyester resins used in the practice of the present invention has the general formula

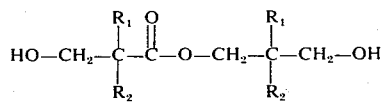

wherein $R_1$ and $R_2$ are as defined above. Examples of alkyl groups which can represent $R_1$ and $R_2$ include: methyl, ethyl, n-propyl, isopropyl, n-butyl, isobutyl, t-butyl and the like. Esterdiols of the type described are known to the art and are available commercially. Esterdiols especially preferred in preparing the polyester resins of the present invention are esterdiols wherein $R_1$ and $R_2$ are methyl. This esterdiol is available commercially from Union Carbide under the trademark Esterdiol-204

The carboxyl containing polyesters of the present invention are prepared in a one-stage reaction wherein the esterdiol and the mixture of aromatic and aliphatic acids are reacted at a temperature of 200° to 250°C in the presence of a suitable esterfication catalyst such as stannous octoate. A stoichiometric excess of polycarboxylic acid is required to react with the esterdiol to prepare the carboxyl containing polyester resin.

The reaction between the polycarboxylic acids and the esterdiol is preferably conducted in the absence of a diluent. An excess of esterdiol may be used as the diluent as the esterdiol will reflux at the temperatures employed for esterification. The esterification reaction is continued until analysis indicates that the acid number of the reaction mixture which is initially about 300 to 325 has been reduced to 80 to 100. Acid number is defined as the number of milligrams of potassium hydroxide required to neutralize the free acidity of 1 gram of non volatile material under the conditions of the test.

In preparing the polyester resin, the mole ratio of polycarboxylic acid to esterdiol ranges from 1:2 to 1:2.5. When the esterdiol is used as the diluent, the weight ratio of esterdiol to polycarboxylic acid may vary from 2:1 to 1:1, about 1.5:1 being preferred.

The esterification reaction is generally conducted in an inert atmosphere at atmospheric pressure although reduced pressures may be used if desired. The time of the reaction is not critical although an acid number of 80–100 is generally reached in a period of 4 to 5 hours of heating.

The heat curable, thermosetting ameniplast resins used in combination with the carboxyl containing polyester resins of the present invention are preferably water dispersible alkylated triazine aldehyde condensates. Water dispersible alkylated triazine aldehyde condensates are known to the art and are prepared by the condensation of an amino-triazine such as melamine, benzoquanamine and acetoquanamine with an aldehyde such as formaldehyde, acetaldehyde, benzaldehyde and the like in the presence of a monohydroxyl alcohol such as methanol and ethanol. Water dispersible alkylated triazine aldehyde condensates are available commercially. For example, Cymel 303 available from American Cyanamid is hexamethoxymethyl melamine, an alkylated triazine aldehyde condensate prepared by the reaction of melamine and formaldehyde in the presence of methanol.

The aqueous coating dispersions used in the practice of the present invention are prepared by dispersing the carboxyl containing polyester resin in an aqueous liquid system containing an amount of an alkaline compound sufficient to effect a dispersion, as the carboxyl containing polyester resins are not readily dispersible in water.

The alkaline compound is present in the aqueous coating dispersions of the present invention in an amount sufficient to neutralize a major amount of the carboxylic acid units present in the carboxyl containing polyester resin. Generally, the amount of alkaline material required to effect a stable dispersion is in the range of about 0.5 to about 1.0 stoichiometric equivalents per carboxyl group in the carboxyl containing polyester.

Among the various alkaline compounds which may be employed as neutralizing reagents to prepare the resin dispersions of the present invention are ammonia, ammonium hydroxide, monoalkyl amines such as ethyl amine and propylamine, secondary and tertiary amines, such as dimethylamine and trimethylamine, diethyl and triethyl amine and the like, monoalkanol amines, such as ethanolamine, propanolamine, dimethyl ethanol amine, dimethyl propanolamine, and polyalkanolamines such as di- and triethanolamine, monocycloalkyl amines such as cyclohexylamines, and monocycloalkano amines such as cyclohexanol amine and diamines such as ethylenediamine and hexamethylenediamine.

The aqueous dispersions used in the practice of the present invention are prepared by dispersing the aminoplast resins in the aqueous dispersion containing the neutralized carboxyl containing polyester resin and a lubricant. Lubricants are preferably non-ionic materials such as organo chlorosilane esters.

To improve the flow properties of the coating compositions of the present invention there is added to the aqueous dispersion about 2 to about 8 percent by weight of a carboxyl containing acrylate polymer comprised of copolymers of acrylic or methacrylic acid with lower (1 to 5 carbon atom) alkyl esters of either or both of these acids or another alkyl ester.

These carboxyl containing polymers generally contain about 5-20% by weight of the acid component.

Preferred carboxyl containing polymers include copolymers of acrylic or methacrylic acid with one or more alkyl acrylates such as methyl acrylate, ethyl acrylate, butyl acrylate, methyl methacrylate and ethyl methacrylate.

A representative and preferred carboxyl containing polymer is Carboset 514 which is an ethyl acrylate/methyl methacrylate/methacrylic acid terpolymer having 10 percent reactive carboxyl groups manufactured by B. F. Goodrich.

The solids content coating compositions of the present invention are comprised of about 70 to about 95 percent by weight and preferably about 80 to 90 percent by weight of the carboxyl containing polyester resin and about 5 to about 20 percent by weight and preferably about 5 to 30 percent by weight of the alkylated triazine/aldehyde condensate.

The aqueous coating compositions of the present invention can be satisfactorily applied at a vehicle solids content ranging from about 40 to about 70 percent by weight, based on the total weight of the aqueous dispersion. Generally, solids content of 45 to 60 percent by weight is preferred.

The aqueous coating compositions of the present invention containing the carboxyl containing polyester/aminoplast vehicle can be satisfactorily applied by any of the conventional methods employed by the coating industry. However, for coating the inner walls of metal containers, spray coating is the preferred method. For general coating purposes, roll and flow coating are also useful methods of application.

After applying the aqueous coating dispersion, the applied coating is cured by heating the coated metal substrate at a temperature of about 300°F to about 450°F for a period of about 2 minutes to 10 minutes.

The preferred coating weight for coating metal container bodies with an adequately protective coating is in the range of 1.0 to 10.0 milligrams of resin coating per square inch of exposed metal surface. To obtain this coating weight, the aqueous resin dispersion is applied at a coating thickness of about 0.1 to 1.0 mils.

The present invention is illustrated but not limited, by the following Example.

EXAMPLE

To a three liter three-necked reaction flask equipped with a magnetic stirrer, nitrogen inlet tube, condenser and water trap were added 102 grams Esterdiol-204, 50 grams trimellitic anhydride, 12.5 grams isophthalic acid, 1.0 gram adipic acid and 0.1 gram stannous octoate. The charged reaction flask was then evacuated and filled with nitrogen. The flask temperature was raised to 200°C at which temperature the solid esterdiol melted and agitation of the reaction mixture initiated. The temperature of the reaction mixture was maintained at 200°–230°C whereat the reaction mixture refluxed and a mixture of Esterdiol-204 and water was collected in the water trap. When 10 grams of water was collected, the acid number was determined to be 100 indicating that a carboxyl containing polyester had been obtained. With the collection of the 10 grams of water, substantially all excess esterdiol has been removed from the reaction mixture.

The temperature of the reaction mixture was reduced to 65°–70°C and then blended with the following ingredients to prepare an aqueous coating having a solids content of 50 percent by weight:

|  | Wt. (Grams) |
| --- | --- |
| Dimethyl ethanol amine | 37.5* |
| Distilled Water | 162.0 |
| Cymel 303 (hexamethoxymethylmelamine) | 37.5 |
| Non-ionic organo - chlorosilane ester | 5.0 |

*Sufficient to neutralize 80% of the acid content in finished polyester.

The aqueous dispersion was relatively clear and had a viscosity of 180 centipoises.

The aqueous coating dispersion was applied by a roll coater to steel plate at a thickness of 2–5 milligrams per square inch of plate surface and then baked 10 minutes in an oven at 390°F. The cured, hardened coating was found to be a tough, adherent, blush free, water resistant film. The coating was evaluated by the following physical tests:

Impact Strength

The impact strength of the film which was cured on the steel plate was measured in accordance with the Gardner Impact Strength Test and recorded in the Table below. The Gardner Impact Test indicates the ability of a coating applied to metal panel to withstand an impact from an impinging ball without cracking or peeling on the convex side of the indentation which results from the impact. In this test, the higher the number the greater the ability of the coating to withstand impact.

Flexibility I

The ability of a coating applied to a steel plate to sustain can forming operations (e.g. double seaming) without substantial loss of adhesion or film integrity is measured by the wedge bend test. In this test, the coated plate is subjected to a 180° bend over a ½ inch mandrel to obtain a U-shaped bend. The bend is then struck with a 5 pound hammer from a distance of 2 feet to form a wedge. The wedge is then immersed in $CuSO_4$ solution. Breaks in the coating at the bent portion of the plate are indicated by the deposition of copper which stains the metal plate. The area free of copper stains is rated from 0–100. A rating of 100 means that no copper staining had been observed.

Flexibility II

The ability of the coating to remain flexible and resist fracturing during the mechanical operations involved in the fabrication of the container were evaluated by fabricating a flanged end closure from a coated steel panel and subjecting the coated end to immersion in an acidic copper sulfate solution for 5 minutes to observe the permeation of the copper sulfate through the film. The penetration of the solution with resultant deposition of copper on the substrate is an indication of failure of the films in stamping operations.

The results of the above ennumerated tests are summarized in the Table below.

For purposes of comparison, the procedure of the Example was repeated to prepare a coating formulation with te exception that adipic acid was not incorporated in the reaction mixture used to prepare the carboxyl containing polyester. The results of the evaluation tests using this comparison coating formulation are also summarized in the Table below.

TABLE

| Coating Composition | Impact Resistance (lbs) | Flexibility I | Flexibility II |
| --- | --- | --- | --- |
| Formulation prepared in Example | 110 | 90 | no stain |
| Comparison Formulation | 80 | 75 | stains, film peels |

By referring to the Table, it is immediately apparent that coating compositions comprised of a mixture of a carboxyl containing polyester resin prepared from an esterdiol and a mixture of aromatic polycarboxylic acids and adipic acid and an alkylated triazine aldehyde condensate exhibit superior impact resistance and flexibility when compared to coating compositions in which adipic acid is not used for preparing the carboxyl containing polyester component.

What is claimed is:

1. An aqueous coating dispersion composition comprised of a vehicle dispersed in water, the vehicle being comprised of
   a. about 70 to 95 percent by weight of a carboxyl containing polyester resin and
   b. about 5 to 30 percent by weight of an aminoplast resin, the carboxyl containing polyester being the reaction product of
   i. an esterdiol having the general formula

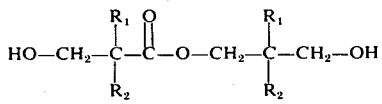

wherein $R_1$ and $R_2$ are alkyl groups having 1–4 carbon atoms and
   ii. a stoichiometric excess of a mixture of polycarboxylic acids comprised of about 97.5 to about 99.9 percent by weight of at least one aromatic polycarboxylic acid or anhydride having 2 to 3 carboxylic acid groups and 0.1 to 2.5 percent by weight of an aliphatic dicarboxylic acid having 4 to 10 carbon atoms.

2. The composition of claim 1 wherein the aminoplast resin is an alkylated triazine aldehyde reaction product of melamine, formaldehyde and methanol.

3. The composition of claim 1 wherein the mixture of polycarboxylic acids is comprised of isophthalic acid, trimellitic anhydride and adipic acid.

4. The composition of claim 1 wherein the esterdiol has the formula

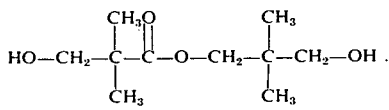

5. A method for coating metal substrates which comprises applying the coating composition of claim 1 to a metal substrate and heating to harden the coating.

6. The method of claim 5 wherein the metal substrate is heated to a temperature of about 300° to about 450°F for a period of about 2 to 10 minutes.

* * * * *